(12) United States Patent
Schwab et al.

(10) Patent No.: US 7,838,603 B2
(45) Date of Patent: Nov. 23, 2010

(54) SILICONE-CONTAINING GRAFT COPOLYMERS OF BLOCKWISE STRUCTURE

(75) Inventors: Peter Schwab, Essen (DE); Philippe Favresse, Ratingen (DE); Tobias Maurer, Velbert (DE); Matthias Pascaly, Münster (DE)

(73) Assignee: Evonik Goldschmidt GmbH (DE)

( * ) Notice: Subject to any disclaimer, the term of this patent is extended or adjusted under 35 U.S.C. 154(b) by 7 days.

(21) Appl. No.: 11/848,618

(22) Filed: Aug. 31, 2007

(65) Prior Publication Data

US 2008/0221276 A1    Sep. 11, 2008

(30) Foreign Application Priority Data

Sep. 1, 2006   (DE) .................. 10 2006 041 088

(51) Int. Cl.
*C08F 283/00*   (2006.01)
*C08F 283/12*   (2006.01)

(52) U.S. Cl. ............................. 525/479; 525/29; 528/27
(58) Field of Classification Search ................ 525/479
See application file for complete search history.

(56) References Cited

U.S. PATENT DOCUMENTS

| 4,368,290 | A | * | 1/1983 | Alberts et al. ............ 525/29 |
| 4,469,840 | A | * | 9/1984 | Alberts et al. ............ 524/500 |
| 4,559,056 | A | * | 12/1985 | Leigh et al. ............ 8/115.64 |
| 5,719,249 | A | * | 2/1998 | Fujita et al. ............ 528/27 |

\* cited by examiner

*Primary Examiner*—Randy Gulakowski
*Assistant Examiner*—Lindsay Nelson
(74) *Attorney, Agent, or Firm*—Frommer Lawrence & Haug LLP

(57) ABSTRACT

The invention describes novel silicone-containing graft copolymers and processes for their preparation. In particular, it relates to silicone-containing graft copolymers P, which are obtained by grafting olefinic monomers M onto polyether-containing radicals of polyoxyalkylene-polysiloxane block copolymers S with $(AB)_n$ structure.

9 Claims, No Drawings

SILICONE-CONTAINING GRAFT COPOLYMERS OF BLOCKWISE STRUCTURE

This application claims benefit under 35 U.S.C. 119(a) of German patent application DE 10 2006 041 088.2, filed on Sep. 1, 2006

Any foregoing applications including German patent application DE 10 2006 041 088.2, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention describes novel silicone-containing graft copolymers and processes for their preparation. In particular, it relates to silicone-containing graft copolymers P, which are obtained by grafting olefinic monomers M onto polyether-containing radicals of polyoxyalkylene-polysiloxane block copolymers S with $(AB)_n$ structure.

In the last few decades, industrially obtained silicones have developed to become a significant and versatile product group which plays an important role in almost all industrial sectors and features steady growth. Particularly the organically modified silicones have, through their manifold possible configurations, contributed to the enabling of a great variety of product types and hence to the development of a multitude of uses.

Owing to the great economic significance, a series of methods have been developed in order to prepare such organically modified siloxanes. To this end, a linkage of free-radical polymerization with silicone chemistry is desirable for many reasons. The advantages of free-radical polymerization lie in the multitude of usable monomers available even on the industrial scale, in the high tolerance with respect to functional groups including carboxyl, hydroxyl, amino and epoxy functions, in the relatively low experimental complexity and the mild and insensitive reaction conditions. However, the direct grafting of organic olefins onto dialkyl siloxanes, in spite of disclosure in the literature, is very unfavorable from a thermodynamic point of view and owing to lack of compatibility, and leads predominantly to the formation of homopolymers without chemical bonding to the siloxane backbone.

Suitable grafting bases are, though, very probably polyether-modified silicones, since the ether groups are considerably more readily attackable by free radicals. It is thus possible to generate free radicals on ethylene oxide-containing and even better propylene oxide-containing polyethersiloxanes by hydrogen abstraction, from which a polymer chain can be grafted on by addition to appropriate vinylic monomers. This is described in DE-A-1 645 569 (U.S. Pat. No. 3,471,588) for comb-like structures. However, comb-like structures tend to gel in the course of the free-radical grafting process, or give rise to relatively high viscous products which are undesired in many applications.

It is therefore an object of the present invention to prepare products with novel properties by grafting polyoxyalkylene-polysiloxane copolymers having a blockwise structure with ethylenically unsaturated monomers. It has now been found that, surprisingly, the use of $(AB)_n$ structures having a blockwise structure as a graft base can solve performance problems in an exceptional manner.

An object of the invention are graft copolymers P based on polyoxyalkylene-polysiloxane block polymers S of the general formula (V)

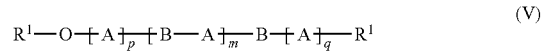

(V)

where the radical

A is a polyoxyalkylene block of the average formula (VI),

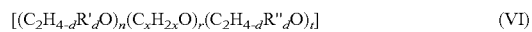

(VI)

where d is from 1 to 3, n is $\geq 0$, x is from 2 to 10, r is $\geq 0$, t is $\geq 0$, n+r+t is $\geq 1$, and R' is a monovalent aromatic, optionally substituted hydrocarbon radical, R" is a hydrogen radical or a monovalent hydrocarbon radical having from 1 to 18 carbon atoms, $R^1$ is a hydrogen atom, a monovalent organic linear or branched alkyl radical of chain length $C_1$-$C_{40}$ or a carboxyl radical or an optionally branched alkyl or aryl ester, B is a polysiloxane block of the average formula (VII),

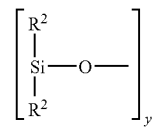

(VII)

where $R^2$ is the same or different and comprises an alkyl radical having from 1 to 4 carbon atoms or a phenyl radical and y is from 5 to 200, m is from 2 to 100, p is from 0 to 1 and q is from 0 to 1, or of the formula (VIII)

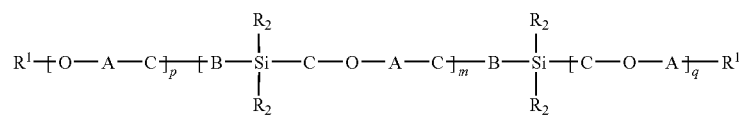

(VIII)

where the $R^1$, A, B radicals and m, p and q are each as defined above and

C is a linear or branched alkylene radical having from 2 to 20 carbon atoms.

The graft copolymers P of the invention are preferably obtainable by free radical graft polymerization of ethylenically unsaturated monomers M in the presence of polyoxyalkylene-polysiloxane block polymers of the formulae (V) or (VIII) as defined above.

The prepared grafted polyether siloxanes P having a blockwise structure are suitable for a wide variety of different applications in which organically modified polyether siloxanes are used. They may have significant improvement in properties compared to grafted comb-like polyether siloxanes. The advantageous properties of the inventive polymers lead, in the textile sector, to the desired property as a hydrophilic softener. The products exhibit very good emulsifiability/dispersability and a correspondingly good emulsion/dispersion stability, which are advantageous for use as textile assistants. In addition, the products exhibit relatively low viscosities at similar graft densities, which lead to simpler processing.

For the preparation of the inventive grafted copolymers P, two processes are possible in principle. In the first process, the polyoxyalkylene-polysiloxane block polymers are prepared before the grafting step; in the second process, the polyethers are first grafted and then the grafted polyethers are reacted with the appropriate siloxanes to give inventive grafted polyether siloxanes P. The inventive products can be prepared by both processes, such that they are indistinguishable.

Any monomeric, ethylenically unsaturated compound and any polymeric olefin with at least one radical of unsaturation (such as polymers of butadiene or isoprene or any type of macromonomers, including those which contain siloxane chains) are suitable for the preparation of the inventive graft copolymers.

The term "ethylenically unsaturated" means that the monomers M have at least one polymerizable carbon-carbon double bond which may be mono-, di-, tri-, or tetra-substituted.

The preferred ethylenically unsaturated monomers M may be described by the following general formula (I):

    X—C(O)CR$^7$=CHR$^6$    (I)

where

X is selected from the group of the OH, OL, OR$^8$, NH$_2$, NHR$^8$, N(R$^8$)$_2$ radicals, R$^7$ and R$^6$ are each independently selected from the group consisting of —H, C$_1$-C$_8$ linear or branched alkyl chains, methoxy, ethoxy, 2-hydroxyethoxy, 2-methoxyethoxy and 2-ethoxyethyl, R$^8$ may be selected identically or differently from the group consisting of C$_1$-C$_{40}$ linear, C$_3$-C$_{40}$ branched-chain, aromatic or C$_3$-C$_{40}$ carbocyclic alkyl radicals, C$_6$-C$_{12}$ polyfunctional alcohols having from 2 to 10 hydroxyl groups, such as ethylene glycol, hexylene glycol, glycerol and 1,2,6-hexanetriol, alcohol ethers such as methoxyethanol and ethoxyethanol, or polyethylene glycols, L is a cation selected from the group consisting of Na$^+$, K$^+$, Mg$^{++}$, Ca$^{++}$, Zn$^{++}$, NH$_4^+$, alkylammonium, dialkylammonium, trialkylammonium, tetraalkylammonium and the corresponding phosphonium ammonium derivatives.

Examples of suitable monomers are esters and amides.

The esters may be derived from C$_1$-C$_{40}$ linear, C$_3$-C$_{40}$ branched-chain, or C$_3$-C$_{40}$ carbocyclic alcohols, from polyfunctional alcohols having from 2 to about 10 hydroxyl groups, such as ethylene glycol, hexylene glycol, glycerol and 1,2,6-hexanetriol, from amino alcohols or from alcohol ethers such as methoxyethanol and ethoxyethanol or polyethylene glycols.

It has been found to be particularly advantageous to use monomers M which, as copolymers, consist of especially ethyl acrylate, methyl acrylate, hydroxyethyl acrylate, n-butyl acrylate, lauryl acrylate, ethyl methacrylate, methyl methacrylate, hydroxyethyl methacrylate, n-butyl methacrylate and lauryl methacrylate.

Also suitable are N,N-dialkylaminoalkyl acrylates and methacrylates and N-dialkylaminoalkylacrylamides und-methacrylamides of the general formula (II)

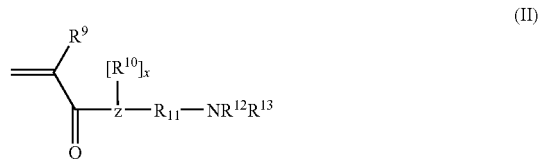

where

R$^9$ is H, alkyl having from 1 to 8 carbon atoms,

R$^{10}$ is H, methyl,

R$^{11}$ is alkylene having from 1 to 24 carbon atoms, optionally substituted by alkyl, R$^{12}$, R$^{13}$ are a C$_1$-C$_{40}$ alkyl radical, Z is nitrogen and x is 1, or oxygen when x=0.

The amides may be unsubstituted, N-alkyl- or N-alkylamino-monosubstituted, or N,N-dialkyl-substituted or N,N-dialkylamino-disubstituted, in which the alkyl or alkyl amino groups are derived from C$_1$-C$_{40}$ linear, C$_3$-C$_{40}$ branched-chain or C$_3$-C$_{40}$ carbocyclic units.

Preferred monomers of the formula (II) are N,N-dimethylaminomethyl (meth)acrylate, N,N-diethylaminomethyl (meth)acrylate, N,N-dimethylaminoethyl (meth)acrylate, N,N-diethylaminoethyl (meth)acrylate and N,N-dimethylaminopropyl (meth)acrylate.

Monomers which are likewise usable are substituted acrylic acids, and also salts, esters and amides thereof, where the substituents on the carbon atoms are in the second or third position of acrylic acid and are each independently selected from the group consisting of C$_1$-C$_4$-alkyl, —CN, COOH more preferably methacrylic acid, ethacrylic acid and 3-cyanoacrylic acid derivatives. These salts, esters and amides of these substituted acrylic acids may be selected as described above for the salts, esters and amides of acrylic acid.

Other suitable monomers are vinyl and allyl esters of C$_1$-C$_{40}$ linear, C$_3$-C$_{40}$ branched-chain or C$_3$-C$_{40}$ carbocyclic carboxylic acids (e.g.: vinyl acetate, vinyl propionate, vinyl neononanoate, vinyl neoundecanoate or vinyl t-butylbenzoates), vinyl or allyl halides, preferably vinyl chloride and allyl chloride, vinyl ethers, preferably methyl, ethyl, butyl, or dodecyl vinyl ether, vinyl formamide, vinylmethylacetamide, vinylamine, vinyllactams, preferably vinylpyrrolidone and vinylcaprolactam, vinyl- or allyl-substituted heterocyclic compounds, preferably vinylpyridine, vinyloxazoline and allylpyridine.

Also suitable are N-vinylimidazoles of the general formula (III) in which R$^{14}$ to R$^{16}$ are each independently hydrogen, C$_1$-C$_8$ alkyl or phenyl:

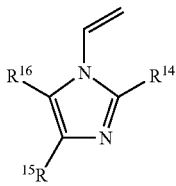

(III)

Further suitable monomers are diallylamines of the general formula (IV)

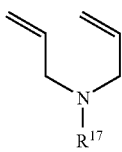

(IV)

where $R^{17}$ is $C_1$-$C_{24}$-alkyl.

Further suitable monomers M which may be used include vinylidene chloride and hydrocarbons having at least one carbon-carbon double bond, preferably styrene, alpha-methyl-styrene, tert-butylstyrene, styrenesulfonate, butadiene, isoprene, cyclohexadiene, ethylene, propylene, 1-butene, 2-butene, isobutylene, vinyltoluene, and also mixtures of these monomers.

Additionally suitable as monomers or comonomers are maleic acid, fumaric acid, maleic anhydride and its monoesters, itaconic acid, crotonic acid, diallyldimethylammonium chloride, vinyl ethers and vinylfuran.

All monomers M, which contain a basic nitrogen atom, may be quaternized before or after the polymerization. For the quaternization, alkyl halides, dialkyl sulfates, dialkyl carbonates and other quaternizing agents according to the prior art may be used. The quaternization may also be achieved with alkylene oxides, for example, ethylene oxide, in the presence of Brønsted acids. Preferred quaternizing agents are methyl chloride, dimethyl sulfate or diethyl sulfate.

In addition to the abovementioned monomers, the monomers used may be so-called macromonomers, for example, silicone-containing macromonomers having one or more free-radically polymerizable groups, or alkyloxazoline macromonomers, as described, for example, in EP-A-408 311 (U.S. Pat. No. 5,166,276).

In addition, it is possible to use fluorinated monomers, as described, for example in EP-B-558 423 compounds which have crosslinking action or regulate the molecular weight in combination or alone.

The regulators used may be the customary compounds known to those skilled in the art, for example sulfur compounds (e.g.: mercaptoethanol, 2-ethylhexyl thioglycolate, thioglycolic acid or dodecyl mercaptan) and also tribromochloromethane or other compounds which have a regulating effect on the molecular weight of the polymers obtained. It is also possible if appropriate to use thiol-containing silicone compounds. However, preference is given to using silicone-free regulators and to adjusting the synthesis conditions such that no regulators need be used.

The crosslinking monomers used may be compounds having at least two ethylenically unsaturated double bonds, for example, esters of ethylenically unsaturated carboxylic acids, such as acrylic acid or methacrylic acid and polyhydric alcohols, ethers of at least dihydric alcohols, for example vinyl ethers or allyl ethers. Also suitable are straight-chain or branched, linear or cyclic, aliphatic or aromatic hydrocarbons which, though, bear at least two double bonds, which must not be conjugated in the case of the aliphatic hydrocarbons. Also suitable are amides of acrylic acid and methacrylic acid, and N-allylamines of at least difunctional amines, for example 1,2-diaminoethane, 1,3-diaminopropane. Also suitable are triallylamine or corresponding ammonium salts, N-vinyl compounds of urea derivatives, at least difunctional amides, cyanurates or urethanes. Further suitable crosslinkers are divinyldioxane, tetraallylsilane or tetravinylsilane.

Particularly preferred crosslinkers are, for example methylenebisacrylamide, triallylamine and triallylammonium salts, divinylimidazole, N,N'-divinylethyleneurea, reaction products of polyhydric alcohols with acrylic acid or methacrylic acid, methacrylic esters and acrylic esters of polyalkylene oxides or polyhydric alcohols which have been reacted with ethylene oxide and/or propylene oxide and/or epichlorohydrin. As is familiar to those skilled in the art, the molecular weights may, though, be adjusted such that no crosslinkers are needed.

Any combination of the monomers mentioned can be used in any mixing ratios. The sole prerequisite is their compatibility. In particular, it is also possible to select those combinations in which the monomers have different reactivities and thus form gradient copolymers.

The inventive graft copolymers may contain any relative amounts of olefin grafted on the polyether. Preferred quantitative ratios vary according to the application and are generally between 10 and 10 000% by weight of the particular present graft base.

A substance which forms free radicals under the reaction conditions, is an essential prerequisite and constituent of the grafting operation to prepare the inventive graft copolymers. All agents which are suitable in principle for generating free radicals can be used, including but not exclusively ionizing radiation, organic peroxy compounds, azo compounds and inorganic free-radical formers.

For better dosage or compatibility of the free-radical formers, solvents which do not interfere with the free-radical polymerization may be used.

The temperature selected for the reaction depends upon the free-radical forming compounds being used. When the free-radical formation is induced thermally, the half-life of decomposition of the primary particles plays a crucial role and can be selected such that a desired ratio of free radicals is always established in the reaction mixture. Suitable temperature ranges are between 30° C. and 225° C.; the upper limit is the thermal decomposition of the graft base.

The monomers M may be homo- or copolymerized using any conventional synthetic method. For example, this may be solution polymerization, emulsion polymerization, inverse emulsion polymerization, suspension polymerization, inverse suspension polymerization or precipitation polymerization, without the usable methods being restricted thereto. The grafting reaction can be effected in the presence or absence of solvents, if necessary also in biphasic or multiphasic systems. The only important prerequisite is the mutual solubility of the reactants in the medium. In solution polymerization, water, customary organic solvents or the silicone derivatives S themselves which are used as the graft base may be used as solvents. This latter process is, however, preferred.

The grafting reaction can be performed under standard pressure, elevated pressure or reduced pressure.

The polyoxyalkylene-polysiloxane block polymers used in the first process to prepare the inventive copolymers P include all the compounds which consist of a silicone moiety and a polyether moiety which are joined in a linear manner via the end groups so as to form $(AB)_n$ structures.

Polyether siloxanes suitable as a graft base are structures of the formula (V)

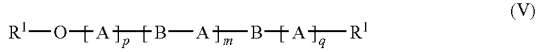

(V)

where the radical
A is a polyoxyalkylene block of the average formula (VI),

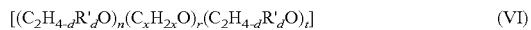

(VI)

where
d is from 1 to 3,
n is $\geq 0$,
x is from 2 to 10,
r is $\geq 0$,
t is $\geq 0$,
n+r+t is $\geq 1$,
and
R' is a monovalent aromatic, optionally substituted hydrocarbon radical,
R" is a hydrogen radical or a monovalent hydrocarbon radical having from 1 to 18 carbon atoms,
$R^1$ is a hydrogen atom, a monovalent organic linear or branched alkyl radical of chain length $C_1$-$C_{40}$ or a carboxyl radical or an optionally branched alkyl or aryl ester,
B is a polysiloxane block of the average formula (VII),

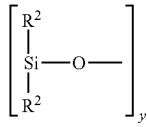

(VII)

where
$R^2$ is the same or different and comprises an alkyl radical having from 1 to 4 carbon atoms or a phenyl radical and
y is from 5 to 200,
m is from 2 to 100,
p is from 0 to 1 and
q is from 0 to 1,
or of the formula (VIII)

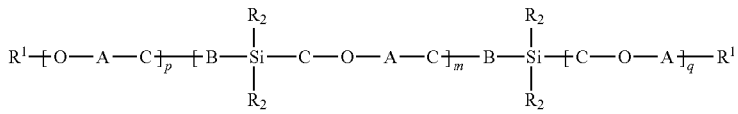

(VIII)

where the $R^1$, A, B radicals and m, p and q are each as defined above and

C is a linear or branched alkylene radical having from 2 to 20 carbon atoms.

The polyoxyalkylene block A of the general formulae (VI and VIII) may also include mixtures of different polyoxyalkylene blocks.

Particular preference is given to those polyoxyalkylene-polysiloxane block polymers in which all $R^2$ radicals are methyl radicals.

It is known to those skilled in the art that the above-described polyoxyalkylene-polysiloxane block polymers often have additional functional and nonfunctional groups, provided that they cannot interfere with the free-radical polymerization process. Examples are silicon-bonded acyloxy groups (acetoxy groups), hydroxyl groups and/or alkoxy groups (methoxy groups), but also substituents on the hydrocarbon groups bonded to silicon, for example halogen atoms or alkoxy groups.

The diallyl polyethers required to prepare the polyoxyalkylene-polysiloxane block copolymers described in formula (VIII) are obtained starting from a starter alcohol, which is preferably allyl alcohol, by addition of monomers. Suitable monomers are ethylene oxide, propylene oxide, compounds from the group of tetrahydrofurans, 1,2-epoxybutane (n-butylene oxide), 2,3-epoxybutane (isobutylene oxide), dodecyl oxide, and also styrene oxide and/or methylstyrene oxide. The distribution of the monomers may be selected as desired, so that, for example, blocks may be present. In addition, it is also possible to use a mixture of the monomers, so as to obtain polyethers in which the units are present in random distribution. Subsequently, the terminal OH group may be reacted, for example, with allyl chloride or methallyl chloride to give the desired diallyl polyether or allyl methallyl polyether. It is equally possible to prepare polyethers having two terminal double bonds in other ways known to those skilled in the art.

The polyoxyalkylene-polysiloxane block copolymers described in the formula (VIII) are prepared by reacting, for example, the diallyl polyether thus obtained with polysiloxanes by addition to terminal SiH groups of the polysiloxane in the presence of a hydrosilylation catalyst. According to the prior art, platinum, palladium or rhodium catalysts can be used. According to the prior art, a low proportion of monofunctional polyether or monofunctional terminal alkene, or a mixture of monofunctional polyethers and alkenes, is added in order to control the chain length.

The dihydroxy-functional polyethers required to prepare the polyoxyalkylene-polysiloxane block copolymers described in formula (V) are obtained from a dihydroxy-functional starter alcohol or water, by addition of monomers. Suitable monomers are ethylene oxide, propylene oxide, compounds from the group of tetrahydrofuran, 1,2-epoxybutane (n-butylene oxide), 2,3-epoxybutane (isobutylene oxide), dodecyl oxide, and also styrene oxide and/or methyl styrene oxide. It is possible to select the distribution of the monomers as desired, such that, for example, blocks may be present. Moreover, it is also possible to use a mixture of the monomers, so as to obtain polyethers in which the units are present in random distribution.

The polyoxyalkylene-polysiloxane block copolymers described in the formula (V) are prepared by reacting the dihydroxy-functional polyethers thus obtained with polysiloxanes by condensation with terminal SiH groups of the polysiloxane in the presence of a coupling catalyst, according to the prior art, for example, a borane catalyst, or by reaction with polysiloxanes which contain terminal SiCl groups. According to the prior art, a low proportion of monofunctional polyether or monofunctional alcohol or a mixture of monofunctional polyethers and alcohols is added in order to control the chain length.

The polyethers used in the second process to prepare the inventive copolymers P include all the difunctional polyethers which, after the grafting operation with α,ω-functional siloxanes, can be bonded in a linear manner so as to form $(AB)_n$ structures.

A multitude of suitable polyether derivatives is obtainable as a graft base.

Particularly suitable polyether derivatives B are those of the general formula (IX),

  (IX)

where
d is from 1 to 3,
n is $\geq 0$,
x is from 2 to 10,
r is $\geq 0$,
t is $\geq 0$,
n+r+t is $\geq 1$,
F is a hydrogen atom or a functional, optionally branched hydrocarbon radical having from 1 to 18 carbon atoms,
R' is a monohydric aromatic, optionally substituted hydrocarbon radical,
R" is a hydrogen radical or a monovalent hydrocarbon radical having from 1 to 18 carbon atoms.

Particular preference is given to dihydroxy-functional polyethers of the general formula (X),

  (X)

where R', R", d, n, x, t and r are each as defined above.

The grafted, difunctional polyethers are then, optionally after further chemical modification, reacted with α,ω-difunctional siloxanes by the methods known to those skilled in the art, to give the inventive grafted linear polyether siloxane copolymers P. Particular preference is given to the reaction of grafted dihydroxy-functional polyethers with α,ω-SiH-siloxanes or α,ω-SiCl-siloxanes.

The dihydroxy-functional polyethers required for this purpose are obtained from a dihydroxy-functional starter alcohol or water, by addition of monomers. Suitable monomers are ethylene oxide, propylene oxide, compounds from the group of tetrahydrofuran, 1,2-epoxybutane (n-butylene oxide), 2,3-epoxybutane (isobutylene oxide), dodecyl oxide, and also styrene oxide and/or methylstyrene oxide. The distribution of the monomers may be selected as desired, such that, for example, blocks may be present. Moreover, it is also possible to use a mixture of the monomers, so as to obtain polyethers in which the units are present in random distribution.

The invention is further described by the following non-limiting examples which further illustrate the invention, and are not intended, nor should they be interpreted, to, limit the scope of the invention.

In the examples which follow, the preparation of the compounds to be used in accordance with the invention is described first. There follow application examples to demonstrate the properties of the inventive compounds and, for comparison with them, properties which can be achieved with known prior art products.

EXPERIMENTAL EXAMPLES

Reference Example 1

Preparation of a Dihydroxy-Functional Polyether

Ethylene oxide/propylene oxide-containing block copolymer (MW≈5.400, 40% EO content) was prepared according to the prior art. For example, 45 g of n-butanediol and 7 g of potassium methoxylate were initially charged in a pressure reactor and heated to 100° C. Subsequently, 3 240 g of propylene oxide and then 2 160 g ethylene oxide were metered in over several hours and the mixture was allowed to react at 100° C. for a further hour. After cooling to 80° C., the reaction mixture was neutralized and transferred.

Reference Example 2

Preparation of a Dihydroxy-Functional Polyether

Ethylene oxide/propylene oxide-containing block copolymer (MW=6 500, 50% EO content) were prepared according to the prior art. For example, 1 mol of $H_2O$ and KOH were initially charged in a pressure reactor and heated to 100° C. Subsequently, 3 240 g of propylene oxide were metered in over several hours and, after a continued reaction time of 1 h, 2 160 g of ethylene oxide over several hours. After a further continued reaction time of 1 h at 100° C. and cooling to 80° C., the reaction mixture was neutralized and transferred.

Reference Example 3

Preparation of an Allyl Polyether (MW=600, 70% EO Content)

For example, 58 g of allyl alcohol and KOH were initially charged in a pressure reactor and heated to 120° C. Subsequently, 120 g of styrene oxide were metered in over several hours and, after a continued reaction time of 1 h, 440 g of ethylene oxide at 100° C. over several hours. After a further continued reaction time of 1 h at 100° C. and cooling to 80° C., the reaction mixture was neutralized and transferred.

Reference Example 4

Preparation of an Allyl Polyether

Ethylene oxide/styrene oxide-containing block copolymer (MW=600, 70% EO content) was prepared according to the prior art. For example, 58 g of allyl alcohol and KOH were initially charged in a pressure reactor and heated to 100° C. Subsequently, 440 g of ethylene oxide were metered in over several hours and, after a continued reaction time of 1 h, 120 g of styrene oxide at 120° C. over several hours. After a further continued reaction time of 1 h at 120° C. and cooling to 80° C., the reaction mixture was neutralized and transferred.

Reference Example 5

Preparation of a Diallyl Polyether

The allyl polyether prepared in Example 4 (1 mol) was initially charged, degassed (vacuum (10 to 20 mbar) and sparged with nitrogen.

With ice cooling, 1.5 mol of cold 50% sodium hydroxide solution were added, in the course of which the temperature was not allowed to exceed 25 to 30° C.

Thereafter, 1.7 mol of allyl chloride were added dropwise within 90 min. The reaction was strongly exothermic. Regulating the rate of dropwise addition kept the temperature just below the boiling point of allyl chloride (<45° C.). This formed a pale yellow to orange suspension.

Once the addition had ended, the mixture was heated under reflux for one hour (60° C.). Thereafter, the unconverted allyl chloride was distilled off at 60° C. and a pressure of 100 mbar. The suspension was filtered.

After transfer to a separating funnel, the aqueous phase was removed and discarded. To remove organic by-products formed during the reaction, the mixture was distilled at 60° C. and 20 mbar (60 min). Subsequently, the mixture was dried over sodium sulfate with vigorous stirring (12 h) and filtered. A clear, yellow to orange product was obtained.

Reference Example 6

Hydrosilylation of a Polysiloxane

In a three-neck flask, 2.6 mol of the polyether prepared in example 5 were initially charged together with 3 mol of an α,ω-SiH-siloxane (N=50, SiH=0.55) and 10 ppm of platinum catalyst, and heated to 90° C. with stirring. After 1 h of continued reaction at 120° C., the clear product was distilled under an oil-pump vacuum (<5 mbar), filtered and transferred.

Reference Example 7

Hydrosilylation of a Polysiloxane

In a three-neck flask, 6.5 mol of the polyether prepared in example 5 were initially charged together with 7 mol of a lateral SiH-siloxane (20.5/5, SiH=2.52) and 10 ppm of platinum catalyst, and heated to 90° C. with stirring. After 1 h of continued reaction at 120° C., the clear product was distilled under an oil-pump vacuum (<5 mbar), filtered and transferred.

Example 1

Process 1

Reaction of an $(AB)_n$ Polyethersiloxane with Styrene Using Trigonox® 117 as an Initiator:

100 g of polyethersiloxane from reference example 6 were heated to 140° C. under a nitrogen atmosphere in a four-neck flask equipped with stirrer, intensive cooler, thermometer and dropping funnel. On attainment of the temperature, 20 g of styrene and 1.8 g of Trigonox® 117 were added dropwise within 60 minutes, in the course of which an exothermic reaction is observed. The reaction mixture was then kept at 150° C. for 1 hour. Subsequently, residual monomers were distilled off at 145° C. under an oil-pump vacuum using a distillation system. A colorless clear product was obtained.

Example 2

Process 1

Reaction of an $(AB)_n$ Polyethersiloxane with Butylmethacrylate Using Trigonox® B as an Initiator.

100 g of polyethersiloxane from reference example 7 were heated to 160° C. under a nitrogen atmosphere in a four-neck flask equipped with stirrer, intensive cooler, thermometer and dropping funnel. On attainment of the temperature, 20 g of butylmethacrylate and 3.6 g of Trigonox® B were added dropwise within 60 minutes, in the course of which an exothermic reaction is observed. The reaction mixture was then kept at 160° C. for 1 hour. Subsequently, residual monomers were distilled off at 145° C. under an oil-pump vacuum using a distillation system. A yellowish, clear product was obtained. The 1H NMR spectrum of the product shows that the benzylic position on the polyether (δ=4.7 to 4.9 ppm) is grafted preferentially.

Example 3

Process 1

Reaction of an $(AB)_n$ Polyethersiloxane with 2-Hydroxyethyl Methacrylate Using Trigonox® D-C50 as an Initiator.

100 g of polyethersiloxane from reference example 7 were heated to 140° C. under a nitrogen atmosphere in a four-neck flask equipped with stirrer, intensive cooler, thermometer and dropping funnel. On attainment of the temperature, 20 g of 2-hydroxyethyl methacrylate and 5.4 g of Trigonox® 201 were added dropwise within 60 minutes, in the course of which an exothermic reaction is observed. The reaction mixture was then kept at 150° C. for one hour. Subsequently, residual monomers were distilled off at 145° C. under an oil-pump vacuum using a distillation system. A yellowish, clear product was obtained.

Example 4

Process 1

Reaction of an $(AB)_n$ Polyethersiloxane with Methyl Acrylate and Methyl Methacrylate Using Perkadox® 16 as an Initiator.

100 g of polyethersiloxane from reference example 6 were heated to 82° C. under a nitrogen atmosphere in a four-neck flask equipped with stirrer, intensive cooler, thermometer and dropping funnel. On attainment of the temperature, 20 g of a 1:1 mixture of methacrylate and methyl methacrylate and 5.4 g of Perkadox® 16 were added dropwise within 60 minutes, in the course of which an exothermic reaction is observed. The reaction mixture was then kept at 100° C. for one hour. Subsequently, using a distillation system, residual monomers were distilled off at 150° C. under oil-pump vacuum. A colorless clear product was obtained.

Example 5

Process 1

Reaction of an $(AB)_n$ Polyethersiloxane with 2-Dimethylaminoethyl Methacrylate Using Trigonox® 117 as an Initiator.

100 g of polyethersiloxane from reference example 6 were heated to 120° C. under a nitrogen atmosphere in a four-neck flask equipped with stirrer, intensive cooler, thermometer and dropping funnel. On attainment of the temperature, 20 g of 2-dimethylaminoethyl methacrylate and 2.5 g of Trigonox® 117 were added dropwise within 60 minutes, in the course of which an exothermic reaction is observed. The reaction mixture was then kept at 130° C. for one hour. Subsequently, using a distillation system, residual monomers were distilled off at 150° C. under an oil-pump vacuum. A yellowish, clear product was obtained.

Example 6

Process 1

Reaction of an $(AB)_n$ Polyethersiloxane with 2-Dimethylaminoethyl Methacrylate and Methoxypolyethylene Glycol 500 Methacrylate Using Trigonox® 117 as an Initiator:

100 g of polyethersiloxane from reference example 6 were heated to 120° C. under a nitrogen atmosphere in a four-neck flask equipped with stirrer, intensive cooler, thermometer and dropping funnel. On attainment of the temperature, 20 g of a 1:1 mixture of 2-dimethylaminoethyl methacrylate and methoxypolyethylene glycol 500 methacrylate, and also 2.5 g of Trigonox® 117 were added dropwise within 60 minutes, in the course of which an exothermic reaction was observed. The reaction mixture was then kept at 130° C. for one hour. Subsequently, using a distillation system, residual monomers were distilled off at 150° C. under an oil-pump vacuum. A yellowish, clear product was obtained.

Example 7

Process 2

Reaction of a Polyether With Methacrylate and Ethylhexyl Acrylate using Trigonox® B as an Initiator:

100 g of dihydroxypolyether from reference example 2 were heated to 82° C. in a four-necked flask equipped with a stirrer, jacketed coiled condenser, thermometer and dropping funnel under a nitrogen atmosphere. On reaching the temperature, 20 g of a 1:2 molar mixture of methacrylate and ethylhexyl acrylate and 5.4 g of Perkadox® 16 were added dropwise in the course of 60 minutes, an exothermic reaction being observed. The reaction mixture was then kept at 100° C. for one hour. Thereafter, with the use of a distillation bridge, residual monomers were distilled off at 150° C. and under a vacuum from an oil pump. A colorless, clear product was obtained.

Example 8

Process 2

Preparation of an $(AB)_n$-Polyethersiloxane:

712 g of the grafted polyether from reference example 13 were initially introduced into a three-necked flask having a stirrer, distillation bridge and gas inlet tube, and the same amount of toluene was added. After about 200 g of toluene had been distilled off for azeotropic drying of the polyether, cooling to 75° C. was effected, the distillation bridge was exchanged for a dropping funnel and 288 g of an α,ω-dichlorodimethylpolysiloxane (B) (chain length=15) were added dropwise in the course of 30 min. After a subsequent reaction time of 1 h at 80° C., neutralization was effected with ammonia, ammonium chloride was filtered off and the mixture was freed from the solvent.

The hydrophilic softening properties of the products from the inventive examples were performance-tested on textile fabrics. The rewet behavior (hydrophilicity) and the hand were compared according to the following descriptions with grafted polyethersiloxanes whose polyethersiloxanes have a comb-like structure and a product known from the market (Sandoperm® SE-1 from Clariant).

Formulation Examples

To this end, 5 parts each of the products were stirred with a propeller stirrer at from 150 to 200 rpm into 95 parts of water in each case at room temperature, and then adjusted to pH 4 to 5 with acetic acid. A clear product is obtained in each case.

Application Examples

To verify the hand and also the hydrophilicity of the present invention, textile fabrics consisting of natural fibers were finished using the following process:

Padding Process:

To examine the hand conferred by each emulsion, knit cotton fabric (160 g/m²) and terry cotton fabric (400 g/m²) were padded with a liquor containing in each case 80 g/l of the corresponding emulsion, squeezed off to a wet pick-up of about 100% and dried at 130° C. for three minutes.

To examine the hydrophilicity, woven cotton fabrics (200 g/m²) were padded with liquor containing in each case 200 g/l of the corresponding emulsion and squeezed off to a wet pick-up of about 100% and dried at 130° C. for three minutes.

Test Methods:

Hand Assessment:

Fabric hand was assessed by an experienced team which assessed the anonymized hand samples, the knit and terry fabrics finished with the emulsions, with the aid of a hand panel test. The hand samples of knit fabric additionally included an untreated sample not overtly labeled.

Hydrophilicity Testing (Rewet Behavior):

Hydrophilicity testing was performed using an in-house test method for measuring the height of rise of water, in line with German standard specification DIN 53924. The finished woven cotton test fabric is cut into five strips each 25 cm in length and 1.5 cm in width, which were marked with a water-soluble pen and secured in a taut perpendicular position, but without tension, to a holder. The holder is subsequently placed for five minutes in a water bath such that 2 cm of the strips are in the water. After the holder has stood outside the water bath for 10 minutes, the height of rise is read off in cm and assessed against the blank value (rise of height of untreated cotton strip×cm=100%) and reported as a percentage of the blank value.

The test results regarding the hand and the hydrophilicity are listed in the table which follows.

| Softener | Rewet behavior (%) | Hand of terry cotton (max 30) | Hand of knit cotton (max 30) |
|---|---|---|---|
| Blank value | 100 | 2 | 5 |
| Sandoperm ® SE 1 | 91 | 23 | 23 |
| Product of Example 5 | 95 | 27 | 24 |
| Product of Example 6 | 97 | 23 | 21 |
| Product with comb-like silicone polyether | 96 | 11 | 14 |

Explanation:

The result is a soft, very fluffy and silky hand of the textile fabrics finished with the inventive products (Example 5+6).

The requirements of the market are achieved or even exceeded. Furthermore, the product thus finished had a high rebound elasticity and improved crease recovery properties. A marked superiority is manifested here compared with products based on comb-like polyethersiloxanes.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. Graft copolymers P based on polyoxyalkylene-polysiloxane block polymers S of the general formula (V)

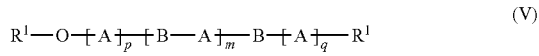

where the radical
A is a polyoxyalkylene block of the average formula (VI),

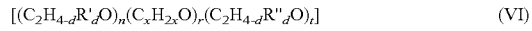

where
d is from 1 to 3,
n is $\geq 0$,
x is from 2 to 10,
r is $\geq 0$,
t is $\geq 0$,
n+r+t is $\geq 1$,
and
R' is a monovalent aromatic, optionally substituted hydrocarbon radical,
R" is a hydrogen radical or a monovalent hydrocarbon radical having from 1 to 18 carbon atoms,
$R^1$ is a hydrogen atom, a monovalent organic linear or branched alkyl radical of chain length $C_1$-$C_{40}$ or a carboxyl radical or an optionally branched alkyl or aryl ester, (VIII)

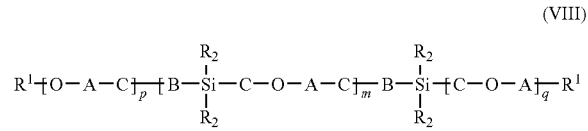

where the $R^1$, A, B radicals and m, p and q are each as defined above and C is a linear or branched alkylene radical having from 2 to 20 carbon atoms
wherein the graft copolymers P are prepared by free radical graft polymerization of ethylenically unsaturated monomers M in the presence of polyoxyalkylene-polysiloxane block polymers of the formula (VIII);
wherein the monomers M are selected from the group of acrylic acid, methacrylic acid, vinyl ethers, vinyl alcohols, vinyl esters, styrene, methyl styrene, tert-butylstyrene, and mixtures and derivatives thereof; and wherein the graft copolymers P further include derivatives of acrylic acid and methacrylic acid of the general formula (I),

where
X is selected from the group of the OH, OL, $OR^8$, $NH_2$, $NHR^8$, $N(R^8)_2$ radicals,
$R^7$ and $R^6$ are each independently selected from the group consisting of —H, $C_1$-$C_8$ linear or branched alkyl chains, methoxy, ethoxy, 2-hydroxyethoxy, 2-methoxyethoxy and 2-ethoxyethyl,
$R^8$ are $C_1$-$C_{40}$ linear, $C_3$-$C_{40}$ branched-chain, aromatic or $C_3$-$C_{40}$ carbocyclic alkyl radicals, $C_6$-$C_{12}$ polyfunctional alcohols having from 2 to 10 hydroxyl groups, such as ethylene glycol, hexylene glycol, glycerol and 1,2,6-hexanetriol, alcohol ethers such as methoxyethanol and ethoxyethanol, or polyethylene glycols,
L is a cation selected from the group consisting of $Na^+$, $K^+$, $Mg^{2+}$, $Ca^{2+}$, $Zn^{2+}$, $NH_4^+$, alkylammonium, dialkylammonium, trialkylammonium, tetraalkylammonium and analogous phosphorus ammonium derivatives.

2. Graft copolymers P according to formula (I) as claimed in claim 1, wherein the free radical graft polymerization of ethylenically unsaturated monomers M is carried out in the presence of dihydroxy-functional polyethers of the general formula (X)

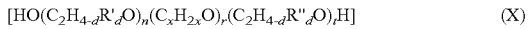

where R', R", d, n, x, t and r have the meanings stated in claim 1 in the description of the polyoxyalkylene block A.

3. Graft copolymers P as claimed in claim 1, wherein the amount of ethylenically unsaturated monomers M in relation to the polyether siloxanes S with a blockwise structure is between 2 and 500% by weight.

4. Graft polymers P as claimed in claim 1, wherein, in the formula (VI) d=1, R'=phenyl and $1 \geq n<15$.

5. Graft copolymers P as claimed in claim 1, obtainable by using initiators which form oxygen-centered free radicals.

6. A method of softening textile fabrics, nonwovens and/or fibers formed from synthetic and/or natural raw materials which comprises adding a grafted polyoxyalkylene polysiloxane copolymer P of claim 1 to a textile fabric, nonwoven and/or fiber formed from synthetic and/or natural raw material.

7. The method of claim 6 wherein the textile fabric is a cotton fabric and the grafted polyoxyalkylene polysiloxane copolymer P is present in concentrations of from 0.01 to 20% by weight, based on the solvent or dispersant.

8. Graft copolymers P as claimed in claim 3, wherein the amount of ethylenically unsaturated monomers M in relation to the polyether siloxanes S with a blockwise structure is between 2 and 200% by weight.

9. Graft copolymers P as claimed in claim 8, wherein the amount of ethylenically unsaturated monomers M in relation to the polyether siloxanes S with a blockwise structure is between 2 and 100% by weight.

* * * * *